Dec. 15, 1931.   R. HENRI ET AL   1,836,071
MOVING PICTURE MACHINE SAFETY DEVICE
Filed Feb. 26, 1927   2 Sheets-Sheet 2
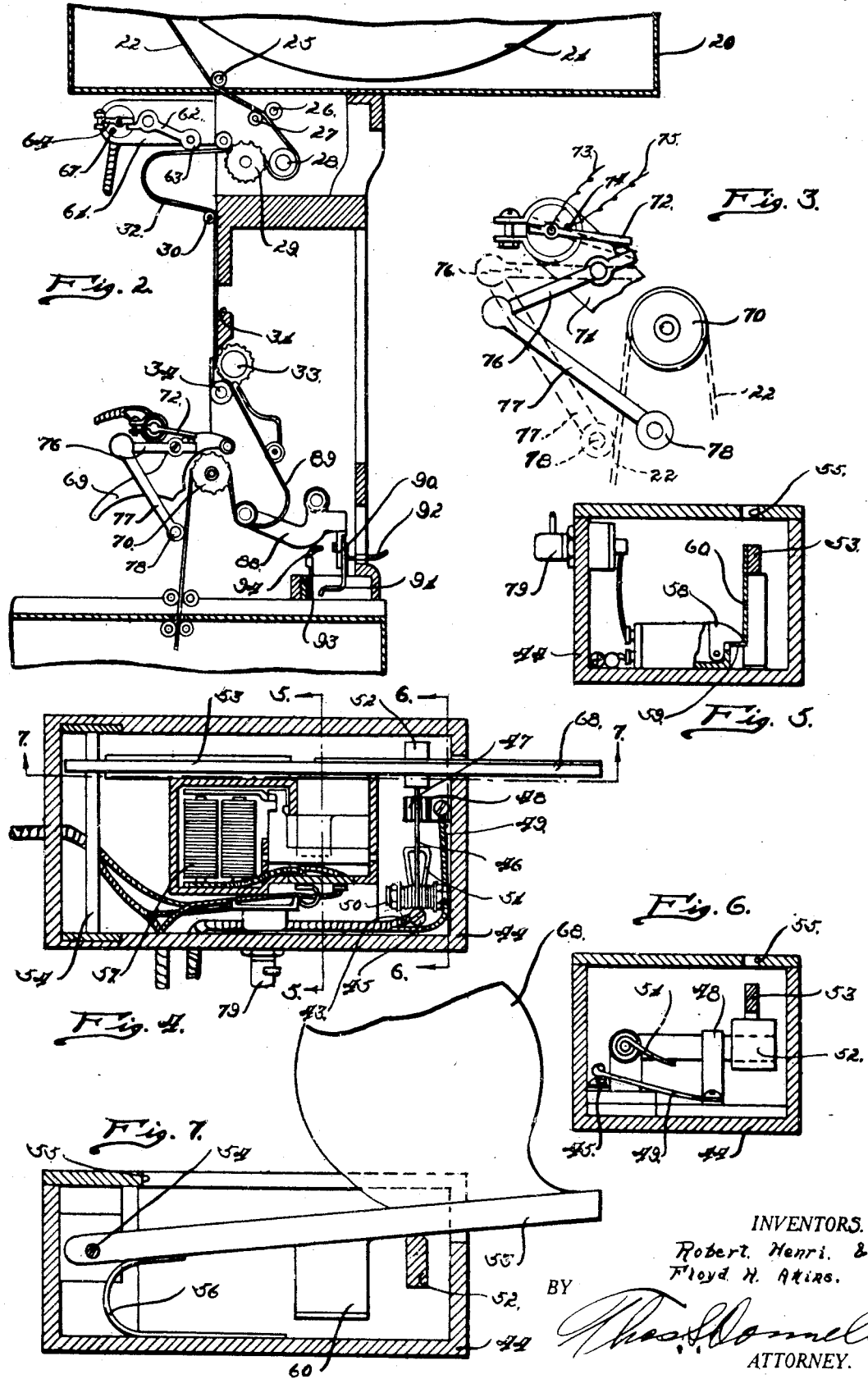
INVENTORS.
Robert Henri &
Floyd H. Atkins.
BY
ATTORNEY.

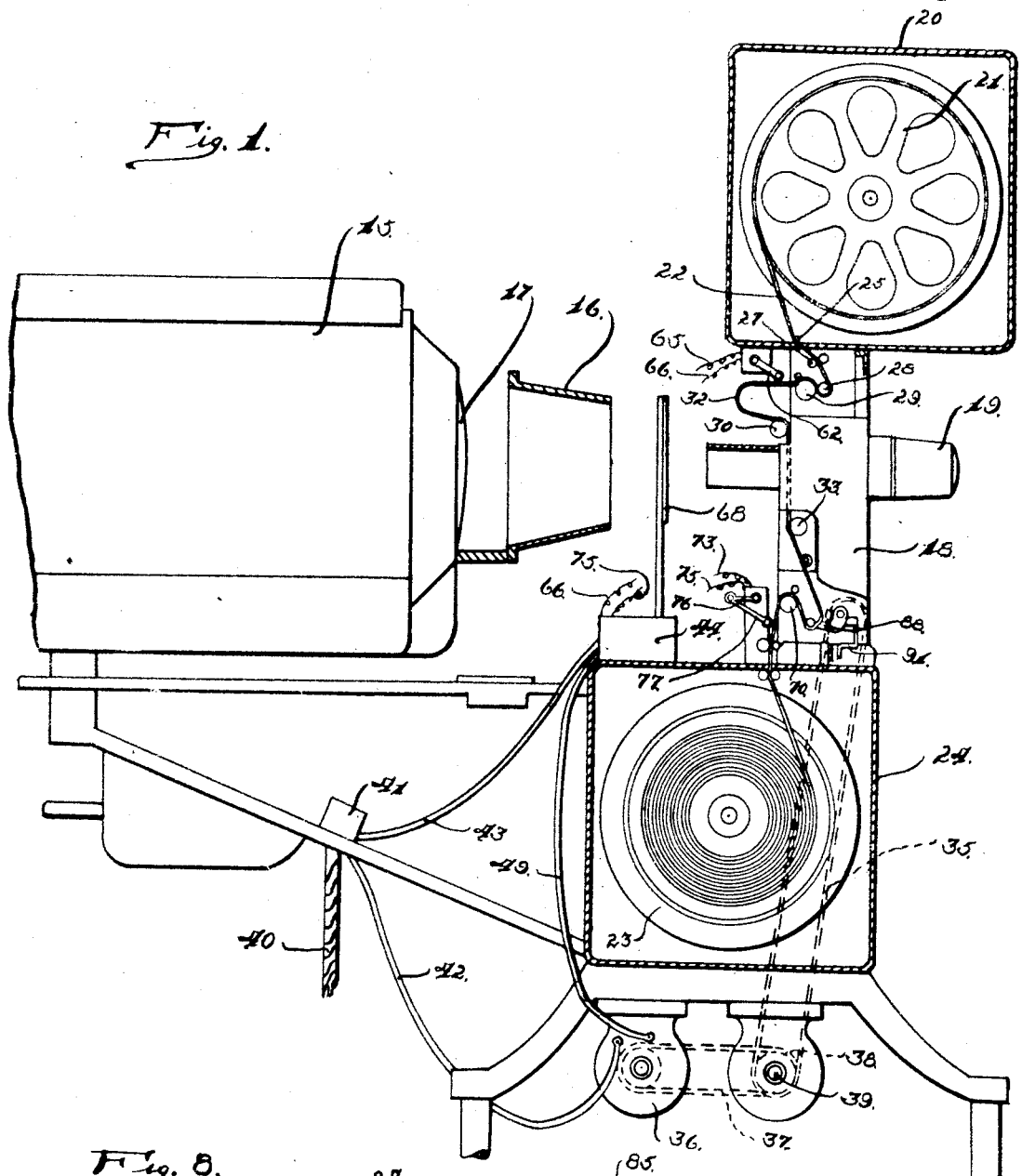

Patented Dec. 15, 1931

1,836,071

UNITED STATES PATENT OFFICE

ROBERT HENRI AND FLOYD H. AKINS, OF DETROIT, MICHIGAN

MOVING PICTURE MACHINE SAFETY DEVICE

Application filed February 26, 1927. Serial No. 171,125.

Our invention relates to a new and useful improvement in a moving picture machine safety device, and has for its object the provision of a device which will prevent fire in connection with the operation of a moving picture machine, particularly a projecting machine.

In the operation of these machines, should, for any reason, the film remain stationary at the light orifice for a short time, on account of the inflammable nature of the film, a fire would result. The stoping of the film in front of the light orifice may be due to various causes, most common of which are the breaking of the film and a tearing of the perforations at the side of the film in which the feed rollers operate. We have provided in the present invention a mechanism whereby the light is deflected upon the stopping of the film for any reason, so that a safety arrangement is provided whereby the impinging of the light upon any specified part of the film for any prolonged length of time is prevented.

Another object of the invention is the provision of a safety device whereby the winding mechanism will cease operating upon a disarrangement of the film or a rendering of the same inoperative for proper feeding.

Another object of the invention is the provision of a mechanism which will provide for the shutting off of the light rays from the film upon inoperativeness resulting from any one of several positions.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of a projecting machine with the film feeding and winding mechanism showing the invention attached.

Fig. 2 is a fragmentary enlarged sectional view illustrating parts of the invention.

Fig. 3 is a fragmentary enlarged side elevational view of a part of the invention.

Fig. 4 is a sectional view showing the housing and switch mechanism used in the invention.

Fig. 5 is a view taken on line 5—5 of Fig. 4.
Fig. 6 is a view taken on line 6—6 of Fig. 4.
Fig. 7 is a view taken on line 7—7 of Fig. 4.
Fig. 8 is a diagrammatic view of the wiring of the invention.

In the drawings we have illustrated a projecting apparatus showing the invention applied, in which there is used a light housing 15 having a light deflector 16 mounted forwardly of the lens 17. The projecting head 18 is provided with the focusing lens 19. A housing 20 is provided in which is positioned a reel 21 from which is wound the film 22 on to the reel 23 positioned in the housing 24, this structure being of conventional type. The customary actuating and retarding mechanism for feeding films of this class is used, and no specific description is given of this actuating and retarding mechanism, other than is necessary for a full understanding of the present invention, as the retarding and accelerating mechanism of itself, forms no specific part of the invention.

Guide rollers 25, 26, 27 and 28 serve to guide the film 22 around a tooth bearing drum or feeder 29, from which the film passes around the roller 30 in front of the light orifice 31, forming a loop 32. A tooth bearing drum 33 engages the film, a springheld roller 34 serving to retain the film in engagement with the drum 33. The feeding mechanism of the device is controlled through a belt 35 and the electric motor 36 connected by the belt 37 to a suitable sprocket wheel 38 mounted on the shaft 39 on which is positioned a sprocket wheel for driving the belt 35. This motor 36 is electrically operated, the energy being supplied through a cable 40 leading to a switch housing 41 from which one of the feed wires 42 extends to the motor 36 and the other end wire 43 extends to the housing 44, this wire 43 being attached to a terminal 45 which is connected to the switch blade 46 adapted to engage between the spring contacts 47 and 48 to close the circuit to the wire 49, this wire 49 leading to the motor 36, so that the circuit to the motor extends through the wire 42 through the wires 43 and 49 and the interposed switch. This switch blade 46 is rockingly mounted on a stud 50 and a spring 51 serves normally to retain the blade 46 in elevated position so that it does not engage between the contacts 47 and 48. Carried on the outer end of the switch blade 46 is an abutment block 52 which is adapted to be engaged by the shield bearing arm 53 which is pivotally mounted on the shaft 54 in the housing 44, this arm riding in a slot 55 formed in the housing 44, and normally held by the bow spring 56 in elevated position.

Mounted in the housing 44 is a magnetic coil 57 which is adapted to control and operate the electric latch 58, this latch 58 engaging the angularly turned portion 59 of a plate 60 which is carried by the shield bearing arm 53.

Swingably mounted on a bracket 61 is a lever 62 having the roller 63 engaging the loop 32 of the film. Rockably mounted on the bracket 61 and insulated therefrom is a contact arm 64 which is connected by the wire 65 to a suitable source of electrical energy. The wire 66 is connected to the pin 67 and the arrangement is such that should the film become broken or the perforations at the edge thereof become worn or torn so that the loop 32 is taken up or destroyed by a breaking of the film to permit the lever 62 to rock on its pivot the rockably mounted contact member 64 will engage the pin 67 and close the circuit to the magnetic coil 57 in the housing 44, thus releasing the electrical latch 58 and permitting the shield bearing arm 53 to move upwardly in response to the pressure of the spring 56, this shield bearing arm 53 in its upward movement carrying the shield 68 into the position shown in Fig. 1, so as to prevent the light rays from the light housing 15 striking the film.

In this manner we have provided a means for shutting off the light from the film should any disarrangement of the film between the light orifice and the reel 21, for any reason, be brought about.

A presser lever 69 is generally used with projecting machines of this type for pressing the film 22 against the feed drum 70, and mounted on an arm 71, projecting outwardly from the presser arm 69, is a rockably mounted contact 72 which is connected by the wire 73 to a suitable source of electrical energy. A contact 74 is connected by the wire 75 to the magnetic coil 57. Rockably mounted on the bracket arm 71 is an arm 76 forming with the arm 77, a bell crank carrying the roller 78 which engages the film 22 after it passes over the feed drum 70. Should a disarrangement of the film take effect so that the film between the drum 70 and the winding reel 23 becomes slack, as this film is held at this location in a taut condition, the arm 76 would rock on its pivot and move the arm 72 upwardly into engagement with the contact 74, this arm 72 being normally, through gravity, held out of engagement with the contact 74. When this movement is effected the circuit would be closed to the magnetic coil 57, thus operating the electrical latch and releasing the shield for movement to operative position. This mechanism would also provide for the emergency which would arise should the motor cease, for any reason, to wind the film on the winding reel 23.

A hand-operated switch 79 is provided whereby the magnetic coil 57 may be rendered inoperative, and the shield 68 retained in inoperative position.

In the diagrammatic view we have illustrated the wiring whereby the housing 44 is represented by the square 44'. The feed wires 80 and 81 lead into the housing and correspond to the wires 43 and 49, the switch 82 being positioned in the housing 41, this switch being a manually operable one. The source of electrical energy 83 is connected by the wire 84 to one end of the magnetic coil 57' used to operate the latch. The switch 79 is represented at 85. The circuit closed by the contacts 64 and 67 is represented by the switch 86. The circuit closed by the contacts 73 and 74 is represented by the switch 87.

Used with these projecting machines is a rockably mounted lever 88, termed a loop setter, to engage the loop 89. Projecting downwardly from the rear end of the loop setter 88 is a bracket forming portion 90 carrying a spring contact 91 connected by the wire 92 to a suitable source of electrical energy and adapted to engage, upon rocking of the link 88, the contact 93, which is connected by the wire 94 to the magnetic coil 57.

The construction and arrangement is such that should the loop 89 be lessened beyond a safe degree, the link 88 will rock on its pivot, being carried upwardly by the loop 89 and bring the contact 91 into engagement with the contact 93, this closing the circuit to the magnetic coil 57 and effecting a release of the electrically operated latch 58. In this way the shielding member will be brought to operative position, even though a portion of the film between the drum 70 and the winding reel 23 remains taut, and this also provides against a defect in the actuating and retarding mechanism which serves to operate the film during the process of winding and unwinding. The switch 95 indicated in the diagrammatic view represents the contacts 91 and 93.

In this way we have provided a safety attachment which may be easily and quickly mounted upon the conventional projecting machine or which may be built into a moving picture machine, whereby protection is afforded against a fire resulting from excessive light rays being directed against the film, and it is believed from the description given that the various emergencies which may arise in the operation of a projecting machine and the various imperfections in the film have been provided for.

While we have illustrated and described the preferred form of our invention, we do not wish to limit ourselves to the precise details of structure shown, but desire to avail ourselves of such variations and modifications as come within the scope of the appended claims.

Having thus described our invention what we claim as new and desire to secure by Letters Patent is:

1. In a moving picture machine of the class described having a light orifice, a light projector for projecting light through said orifice, winding reels, a film wound on said reels, and means for rotating a reel: a pivotally mounted arm, a protective member mounted on said arm for preventing, when in operative position, direct travel of light from said projector through said orifice, said protective member being normally in inoperative position: means for retaining said protective member in inoperative position; a plurality of means for effecting a release of said retaining means upon disarrangement of said film from normal condition between said reels; resilient means engaging said arm for moving said protective member to operative position upon release of said retaining means; a switch for controlling the operation of said rotating means; a rockably mounted arm for closing said switch upon movement to closing position; resilient means engageable with said rockable arm normally tending to move said rockable arm to non-closing position, said rockable arm being engaged by said pivotally mounted arm upon movement of said protective member to inoperative position and retained in closing position.

2. In a device of the class described, a pivotally mounted shield bearing arm; a plate carried by said arm; an angularly turned portion on the lower edge of said plate; resilient means for normally moving said arm to operative position; an electric latch for engaging said angularly turned portion and retaining said arm in inoperative position; a control switch; a switch blade for opening and closing said switch; resilient means normally tending to move said switch blade to inoperative position; an abutment block carried by said switch blade and engageable with said shield bearing arm for moving said switch blade into operative closing position upon movement of said shield bearing arm into inoperative position.

In testimony whereof we have signed the foregoing specification.

ROBERT HENRI.
FLOYD H. AKINS.